United States Patent [19]
Ono et al.

[11] Patent Number: 5,278,109
[45] Date of Patent: Jan. 11, 1994

[54] COMPOSITE MATERIALS FOR SLIDING MEMBERS

[75] Inventors: Toru Ono; Hidehiro Endo, both of Tokyo; Kanao Fukuda; Masanori Ueki, both of Kawasaki, all of Japan

[73] Assignee: Nippon Steel Corporation, Tokyo, Japan

[21] Appl. No.: 965,792

[22] Filed: Oct. 23, 1992

[30] Foreign Application Priority Data

Oct. 31, 1991 [JP] Japan .................................. 3-311436
Jul. 2, 1992 [JP] Japan .................................. 4-197424

[51] Int. Cl.$^5$ .............................................. C04B 35/56
[52] U.S. Cl. ........................................ 501/87; 252/11; 252/29; 252/30; 501/99
[58] Field of Search ...................... 501/87, 99; 252/11, 252/29, 30

[56] References Cited

U.S. PATENT DOCUMENTS

| | | | |
|---|---|---|---|
| 2,491,410 | 12/1949 | Laughlin et al. ................ | 501/87 |
| 3,094,428 | 6/1963 | Hamilton et al. ................ | 252/30 |
| 3,711,171 | 1/1973 | Orkin et al. ..................... | 252/29 |
| 4,720,349 | 1/1988 | Kobayashi et al. .............. | 252/30 |

FOREIGN PATENT DOCUMENTS

63-230569 9/1988 Japan .

OTHER PUBLICATIONS

Nippon Seramikkusu Gakujutsu Ronbunshi 97[5], 1989, pp. 507-512.

*Primary Examiner*—Karl Group
*Assistant Examiner*—Deborah Jones
*Attorney, Agent, or Firm*—Pollock, Vande Sande & Priddy

[57] ABSTRACT

Provided is a composite material for sliding members which comprises a titanium carbide matrix and graphite particles excellent in crystallinity which are uniformly dispersed in the titanium carbide matrix. This composite material has self-lubricity and high wear resistance together with the excellent properties of titanium carbide such as high strength, high hardness, high melting point, low specific gravity and high electrical conductivity.

11 Claims, 6 Drawing Sheets

COMPOSITE MATERIALS FOR SLIDING MEMBERS

BACKGROUND OF THE INVENTION

1. Field of the Invention

The present invention relates to a material for sliding members which comprises a composite material of titanium carbide and graphite. More particularly, it relates to a composite material for sliding members which comprises a titanium carbide matrix and a uniform dispersion of graphite in the matrix and which is excellent in self-lubricity and wear resistance.

2. Description of Related Art

Titanium carbide is a ceramic having excellent characteristics such as high strength, high hardness, high melting point, low specific gravity and high electrical conductivity, but is employed only in limited uses for structural materials because of its brittleness. For example, it is used merely as dispersions in cermets or ceramics.

Recently, for obtaining ceramic sintered bodies comprising titanium carbide excellent in mechanical properties as a base, researches have been made on adding various metals, carbides, nitrides or carbon to titanium carbide. Especially, carbon has been being studied as a second phase to be added to titanium carbide because of its self-lubricity based on its molecular structure and compatibility with carbides.

For example, Japanese Patent Kokai (Laid-Open) No. 63-230569 proposes a sintered body comprising titanium carbide and 30% by weight or less of a carbide, a nitride and/or carbon contained as impurities and a method for producing the sintered body. However, the invention of this patent publication has developed titanium carbide as structural materials and it does not require sliding characteristics for titanium carbide. Accordingly, there has been no idea of obtaining materials to be used for sliding members by dispersing graphite in titanium carbide utilizing the above excellent characteristics of titanium carbide.

Furthermore, as materials comprising titanium carbide, "Nippon Seramikkusu Gakujutsu Ronbunshi", 97[5], 1989, pp. 507-12 has proposed a composite material of boron carbide-doped titanium carbide and carbon. However, this literature does not relate to sliding materials. The literature discloses a material comprising titanium carbide in which 5-15% by weight of graphite having a particle size of 3-5 μm is dispersed for improving brittleness of titanium carbide using carbon black. It is clear that since carbon black is used as the raw material, carbon is not uniformly graphitized and even if the composite material is used as materials for sliding members, it is not suitable for that purpose.

As mentioned above, there have been no examples of obtaining materials for sliding members using titanium carbide and utilizing the self-lubricity of graphite.

SUMMARY OF THE INVENTION

The present invention provides a material for sliding members which comprises titanium carbide as a matrix in which graphite is dispersed and which possesses the excellent properties of titanium carbide such as high strength, high hardness, high melting point, low specific gravity and high electrical conductivity together with high wear resistance.

The present invention provides a material for sliding members which comprises a titanium carbide matrix containing 17-25% by weight of graphite.

The present invention provides a material for sliding members which comprises a titanium carbide matrix containing 10-30% by weight of graphite and which has a dry friction coefficient against copper of 0.5 or less.

The present invention provides a material for sliding members which comprises a titanium carbide matrix containing 10-30% by weight of graphite and which has a specific wear rate of copper of $3 \times 10^{-9}$ mm$^2$/N or less in a dry sliding test with copper.

DETAILED DESCRIPTION OF PREFERRED EMBODIMENTS

According to the present invention, utilizing the excellent properties of titanium carbide such as high strength, high hardness, high melting point, low specific gravity and high electrical conductivity, a composite material for sliding members is obtained by graphite dispersed in titanium carbide.

The most important feature of the composite material of the present invention is self-lubricity. In order to realize this property, it is essential to disperse the second phase of graphite having excellent crystallinity. The "excellent crystallinity" means that the graphite crystal structure contains substantially no amorphous phase from the raw material.

Besides well crystallized graphite powder, many kinds of amorphous carbon such as carbon black, carbon-containing polymeric resin, pitch and mesocarbon are generally used for the graphite source. It is important that the graphite used is one which is graphitized in such a manner that it has excellent crystallinity. In order to graphitize the amorphous carbon so that they have excellent crystallinity, a high sintering temperature of at least 2300° C. is needed. Conventionally, it has been proposed to use carbon black as a carbon source for the composite material, but it has been found that when the composite material is subjected to graphitization treatment, the carbon black is not converted to graphite having excellent crystallinity in substantially a sufficient amount at a low temperature. Moreover, the graphitization of carbon black with uniform grain growth occurs at a high temperature, and the graphite dispersion with a uniform grain size tends to occur especially when the amount of carbon is more than 10% by weight.

According to the present invention, since graphite particles having excellent crystallinity as a starting raw material are dispersed in titanium carbide, any high temperature is not needed for sintering and nonuniform growth of particles caused by graphitization does not occur and thus, a titanium carbide-graphite composite material having good self-lubricity can be obtained.

That is, according to the present invention, 3-30% by weight, more preferably 10-30% by weight, most preferably 17-25% by weight of graphite containing titanium carbide sintered possesses a good self-lubricity and wear resistance which can be used for sliding members. When the content of graphite is less than 3% by weight, the self-lubricity and wear resistance are not sufficient and when it is more than 30% by weight, the strength of the resulting material approximates to the strength of graphite single phase (i.e., ~100 MPa) and wear resistance is lost. Furthermore, when higher mechanical strength is desired, the content of graphite is suitably 3-15% by weight and when higher self-lubricity is desired, it is preferably 15-30% by weight.

In the composite material of the present invention, the average particle size of titanium carbide is preferably 1-10 $\mu$m, more preferably 2-5 $\mu$m and that of graphite is preferably 3-6 $\mu$m. When the average particle size of titanium carbide is less than 1 $\mu$m, owing to the effect of small oxides on the surface of the carbide, the strength and electrical conductivity of the sintered body deteriorate, and when it is less than 2 $\mu$m, the fracture toughness decreases. When it is more than 5 $\mu$m, the particle size after sintering increases and reduction in strength is apt to be brought about. When it exceeds 10 $\mu$m, the strength of the sintered body reduces. When the average particle size of graphite particles is less than 3 $\mu$m, the mechanism to obtain high toughness provided by the second phase dispersion is lost, and when it is more than 6 $\mu$m, the strength of the sintered body reduces.

The graphite particles used in the present invention preferably have a density of 2.22 g/cc or higher. The graphite having a density of 2.22 g/cc has an interplanar spacing in a c-axis direction of 3.42 Å in crystal, and this means that it is preferred to use graphite particles having an interplanar spacing of 3.42 Å or less.

The composite material of the present invention can be obtained by milling 3-30% by weight of graphite particles and the remainder amount of titanium carbide in an aqueous solution containing a surfactant in an amount of 0.1-0.5% by volume, subjecting the resultant slurry to dehydration, drying and grinding to obtain mixed powders of titanium carbide and graphite and sintering the mixed powders. The milling time is preferably 4-48 hours and sintering is preferably carried out by hot pressing using a carbon die under a pressure of 25 MPa or higher for 60-180 minutes in an argon-atmosphere of 1800° C. or higher. As hot pressing conditions, a higher temperature and pressure are preferred since both the titanium carbide and the graphite have high melting points and are chemically stable in an inert gas atmosphere.

The titanium carbide-graphite composite material of the present invention having the microstructure comprising a titanium carbide matrix in which the graphite is uniformly dispersed can be produced by the above-mentioned method.

The present invention will be illustrated in detail with reference to the following Examples.

EXAMPLE 1

To titanium carbide powders (average particle size: 2 $\mu$m; purity: 99% or higher) were added 5% by weight of graphite powders (density: 2.258 g/cc; average particle size: 4 $\mu$m; purity: 99.9% or higher) and the mixture was milled for 17 hours in a planetary ball mill using 0.2 vol% aqueous polyoxyethylene sorbitan monolaurate solution as a solvent.

The milled powders were subjected to absorption dehydration and drying at 100° C. for 24 hours and then were ground to recover mixed powders.

Figure 1:
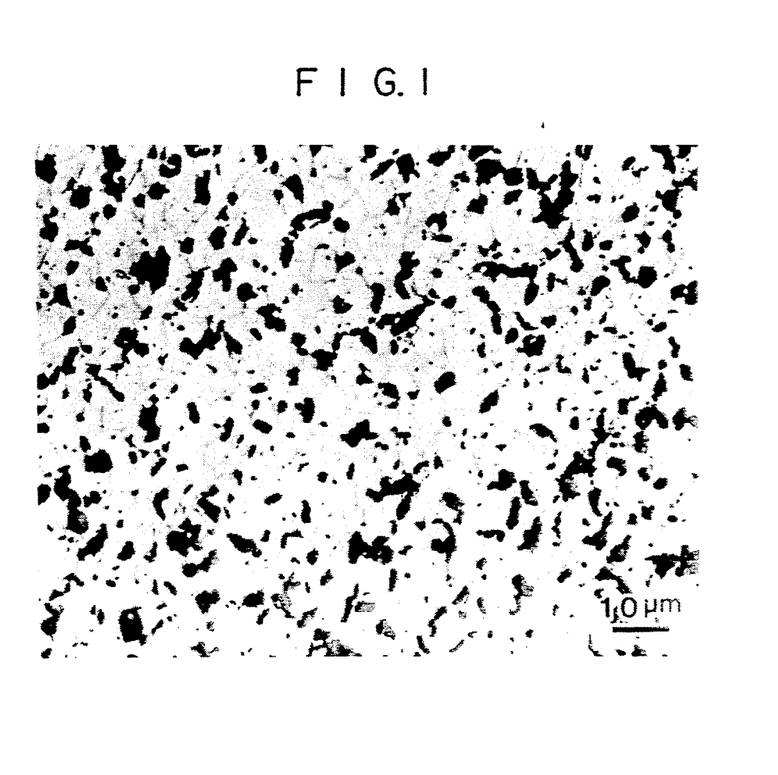
FIG. 1 is an optical micrograph showing the microstructure of a sintered body of the present invention which contains 5% by weight of graphite (magnification: ×1,000).

The resulting mixed powders were hot pressed at 2000° C. for 2 hours under a pressure of 40 MPa in an argon atmosphere to obtain a sintered body. FIG. 1 is an optical micrograph which shows the microstructure of the thus obtained sintered body.

Furthermore, there were measured the relative density, room temperature strength (three-point bending strength according to JIS R 1601 measured at a cross-head speed of 0.05 mm/min), fracture toughness (measured according to JIS R 1607: SEPB method: at a cross-head speed of 0.05 mm/min), hardness (Vickers hardness according to JIS Z 2244: measured under a load of 98N for a holding time of 15 seconds) and resistivity (direct current four probe method) of the sintered body. The results are shown in Table 1.

In FIG. 1, the white portions indicate titanium carbide and the black portions indicate graphite. The average particle size of the titanium carbide was obtained by measurement of the mean intercept length using the stereologg method. The average grain of titanium carbide was about 5.0 $\mu$m and it can be seen that graphite was uniformly dispersed.

It can also be seen that the particle size of titanium carbide was controlled to a much smaller size as compared with that of the microstructure of a titanium carbide single phase referred to hereinafter.

The sintered body of this Example has the highest three-point bending strength as compared with the sintered bodies obtained in the Examples. This is considered to be due to the effect of graphite to inhibit growth of titanium carbide grains.

EXAMPLE 2

To titanium carbide powders (average particle size: 2 $\mu$m; purity: 99% or higher) were added 10% by weight of graphite powders (density: 2.258 g/cc; average particle size: 4 $\mu$m; purity: 99.9%). A sintered body was obtained in the same manner as in Example 1.

Figure 2:
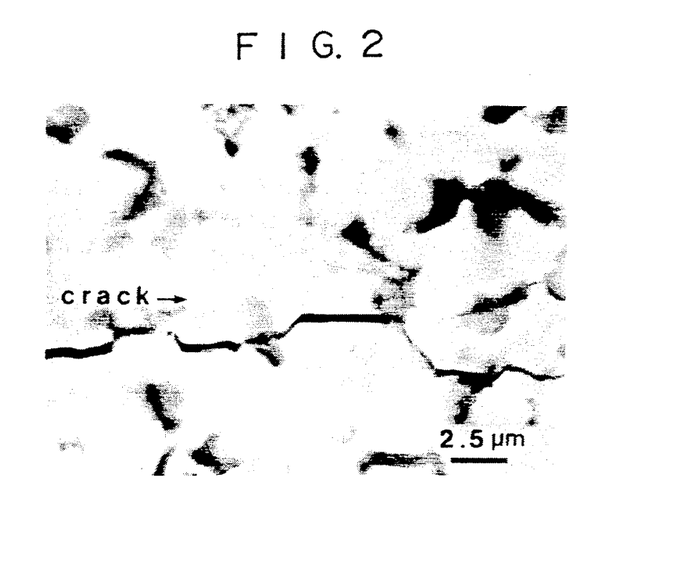
FIG. 2 is an SEM showing propagation of cracks starting from a Vickers indentation on the surface of a sintered body of the present invention which contains 10% by weight of graphite (magnification: ×4,000).

The state of cracks propagated from Vickers indentation on the surface of the resulting sintered body is shown in FIG. 2. The relative density, mechanical properties and resistivity measured in the same manner as in Example 1 are shown in Table 1. It can be seen in FIG. 2 that the direction of propagation of the cracks from Vickers indentation was complicatedly deflected by the graphite particles. This crack deflection is considered to be the main cause for improvement of fracture toughness shown in Table 1.

The friction coefficient and wear rate were measured using the pin-on-disc method. The results of the sliding test on the sintered body obtained above against Cu (OFHC) in dry air are shown in Table 2. The sintered body was used as disc material and Cu (OFHC) was used as pin material. The measurement were under a load of 8.3N, a peripheral speed of 62.8 mm/s and a measuring time of 5,000 seconds.

Addition of the graphite resulted in decrease of an average friction coefficient and reduction of deviation.

Figure 3:
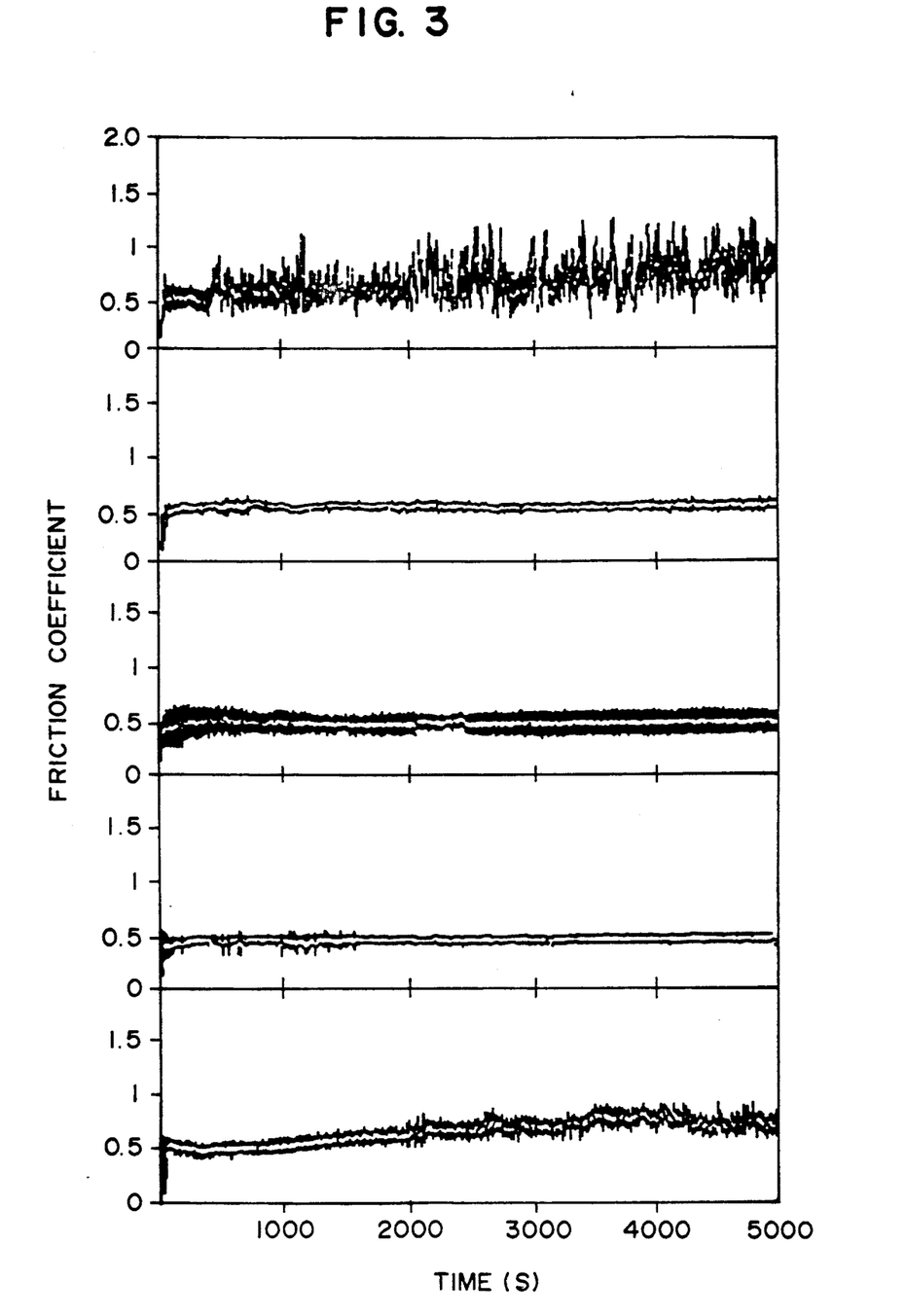
FIG. 3 is graphs indicating changes of friction coefficient in sliding test against copper in dry air on sintered bodies of the present invention containing 10, 15 and 20% by weight of graphite, a sintered body consisting of a titanium carbide single phase and a sintered body containing 10% by weight of carbon black as a carbon source.

Improvement of the sliding characteristics is clear from the change of friction coefficient during the sliding test shown in FIG. 3. That is, the sliding characteristics were rendered stable by development of solid lubricating effect caused by addition of graphite.

Furthermore, as shown in Table 2, the wear rate of the Cu pin material decreased and wear rate of the disc increased. This is considered to be caused by inhibition of the adhesion of pin material, Cu, to the disc by the solid lubricating effect due to peeling of graphite lamellae.

EXAMPLE 3

To titanium carbide powders (average particle size: 2 μm; purity: 99% or higher) were added 15% by weight of graphite powders (density: 2.258 g/cc; average particle size: 4 μm; purity: 99.9% or higher). A sintered body was obtained in the same manner as in Example 1.

The measurements of the relative density, mechanical properties and resistivity of the resulting sintered body are shown in Table 1. The sliding characteristics measured in the same manner as in Example 2 and changes in friction coefficient during the sliding test are shown in Table 2 and FIG. 3, respectively.

Reduction in a room-temperature strength with increase in an added amount of low-strength graphite was seen, but the fracture toughness was the highest among the sintered bodies of the Examples. Furthermore, the resistivity increased due to addition of graphite having a higher resistivity than that of titanium carbide. Anisotropy in the direction of hot pressing became gradually larger.

The sliding characteristics, i.e., the friction coefficient and wear rate became further conspicuously decreased with increase of the added amount of graphite.

EXAMPLE 4

To titanium carbide powders (average particle size: 2 μm; purity: 99% or higher) were added 17% by weight of graphite powders (density: 2.258 g/cc; average particle size: 4 μm; purity: 99.9% or higher). A sintered body was obtained in the same manner as in Example 1.

The measurements of the relative density, mechanical properties and resistivity of the resulting sintered body are shown in Table 1. The sliding characteristics measured in the same manner as in Example 2 and changes in friction coefficient during the sliding test are shown in Table 2.

EXAMPLE 5

To titanium carbide powders (average particle size: 2 μm; purity: 99% or higher) were added 19% by weight of graphite powders (density: 2.258 g/cc; average particle size: 4 μm; purity: 99.9% or higher). A sintered body was obtained in the same manner as in Example 1.

The measurements of the relative density, mechanical properties and resistivity of the resulting sintered body are shown in Table 1. The sliding characteristics measured in the same manner as in Example 2 and changes in friction coefficient during sliding test are shown in Table 2.

EXAMPLE 6

To titanium carbide powders (average particle size: 2 μm; purity: 99% or higher) were added 20% by weight of graphite powders (density: 2.258 g/cc; average particle size: 4 μm; purity: 99.9% or higher). A sintered body was obtained in the same manner as in Example 1.

The measurements of the relative density, mechanical properties and resistivity of the resulting sintered body are shown in Table 1. The sliding characteristics measured in the same manner as in Example 2 and changes in friction coefficient during sliding test are shown in Table 2 and FIG. 3, respectively. The mechanical strength somewhat decreased with increase of the added amount of graphite, but the sliding characteristics were markedly improved as shown in Table 2 and FIG. 3, respectively. The mechanism for improvement of the sliding characteristics is seen from observation of the microstructure shown in FIG. 4.

Figure 4:
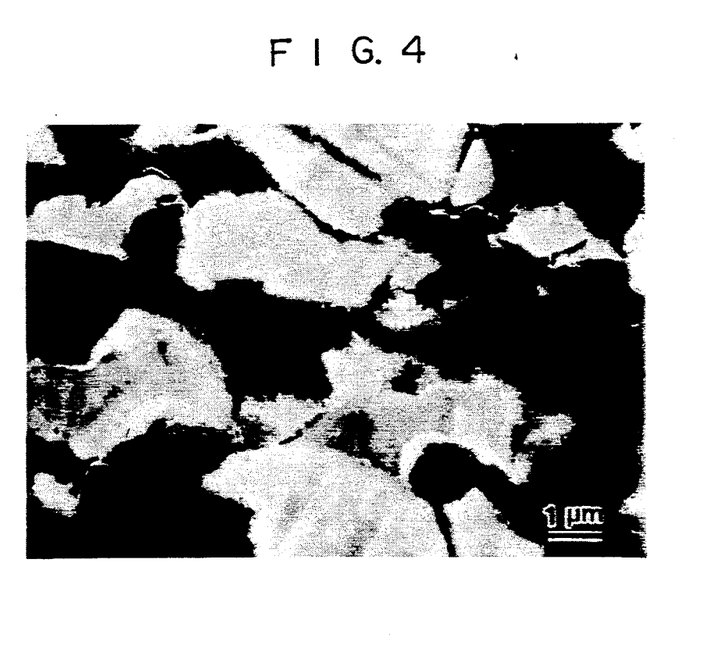
FIG. 4 is an electron micrograph showing the microstructure of a sintered body of the present invention which contains 20% by weight of graphite (magnification: ×10,000).

In FIG. 4, graphite lamellae are dispersed in such a manner that they cover the titanium carbide particles and part of them are delaminated. This indicates that the sintered body had superior self-lubricity.

EXAMPLE 7

To titanium carbide powders (average particle size: 2 μm; purity: 99% or higher) were added 22% by weight of graphite powders (density: 2.258 g/cc; average particle size: 4 μm; purity: 99.9% or higher). A sintered body was obtained in the same manner as in Example 1.

The measurements of the relative density, mechanical properties and resistivity of the resulting sintered body are shown in Table 1. The sliding characteristics measured in the same manner as in Example 2 and changes in friction coefficient during sliding test are shown in Table 2.

EXAMPLE 8

To titanium carbide powders (average particle size: 2 μm; purity: 99% or higher) were added 24% by weight of graphite powders (density: 2.258 g/cc; average particle size: 4 μm; purity: 99.9% or higher). A sintered body was obtained in the same manner as in Example 1.

The measurements of the relative density, mechanical properties and resistivity of the resulting sintered body are shown in Table 1. The sliding characteristics measured in the same manner as in Example 2 and changes in friction coefficient during sliding test are shown in Table 2.

EXAMPLE 9

To titanium carbide powders (average particle size: 2 μm; purity: 99% or higher) were added 25% by weight of graphite powders (density: 2.258 g/cc; average particle size: 4 μm; purity: 99.9% or higher). A sintered body was obtained in the same manner as in Example 1.

The relative density, mechanical properties and resistivity of the resulting sintered body are shown in Table 1. Decrease in strength with increase in the added amount of graphite made preintroduction of cracks for application of the SEPB method difficult and measurement of fracture toughness impossible.

Moreover, the Vickers hardness was outside the measurable range, which indicates the machinability as well as the self-lubricity was improved.

EXAMPLE 10

To titanium carbide powders (average particle size: 2 μm; purity: 99% or higher) were added 27% by weight of graphite powders (density: 2.258 g/cc; average particle size: 4 μm; purity: 99.9% or higher). A sintered body was obtained in the same manner as in Example 1.

The measurements of the relative density, mechanical properties and resistivity of the resulting sintered body are shown in Table 1. The sliding characteristics measured in the same manner as in Example 2 and changes in friction coefficient during the sliding test are shown in Table 2.

EXAMPLE 11

To titanium carbide powders (average particle size: 2 μm; purity: 99% or higher) were added 29% by weight of graphite powders (density: 2.258 g/cc; average particle size: 4 μm; purity: 99.9% or higher). A sintered body was obtained in the same manner as in Example 1.

The measurements of the relative density, mechanical properties and resistivity of the resulting sintered body are shown in Table 1. The sliding characteristics measured in the same manner as in Example 2 and changes in friction coefficient during the sliding test are shown in Table 2.

EXAMPLE 12

To titanium carbide powders (average particle size: 2 μm; purity: 99% or higher) were added 30% by weight of graphite powders (density: 2.258 g/cc; average particle size: 4 μm; purity: 99.9% or higher). A sintered body was obtained in the same manner as in Example 1.

Figure 5:
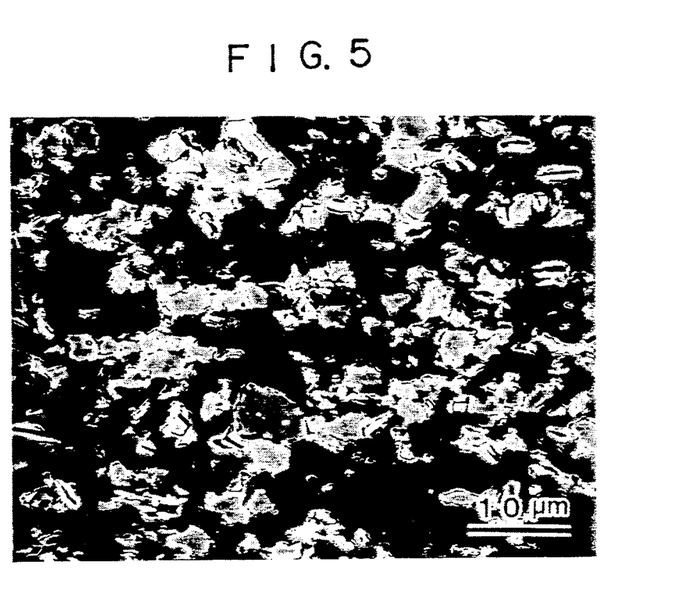
FIG. 5 is an electron micrograph showing the microstructure of a sintered body of the present invention which contains 30% by weight of graphite (magnification: ×2,000).

The microstructure of the resulting sintered body is shown in FIG. 5. The measurements of the relative density, mechanical properties and resistivity of the sintered body are shown in Table 1.

As shown in FIG. 5, when 30% by weight (about 50% by volume) of graphite is added, the graphite begins to form a matrix, and when the added amount of graphite exceeds the above amount, the relation between titanium carbide as matrix and graphite as second phase is reversed.

COMPARATIVE EXAMPLE 1

Titanium carbide powders (average particle size: 2 μm; purity: 99% or higher) were hot pressed at 2000° C. for 2 hours under a pressure of 40 MPa to obtain a sintered body.

Figure 6:
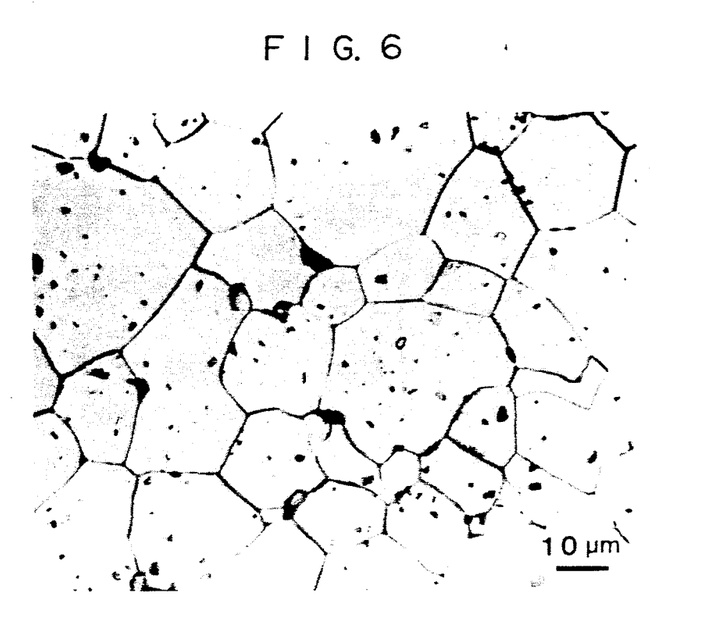
FIG. 6 is an optical micrograph showing the microstructure of a sintered body consisting of a titanium carbide single phase (magnification: ×1,000).
Figure 7:
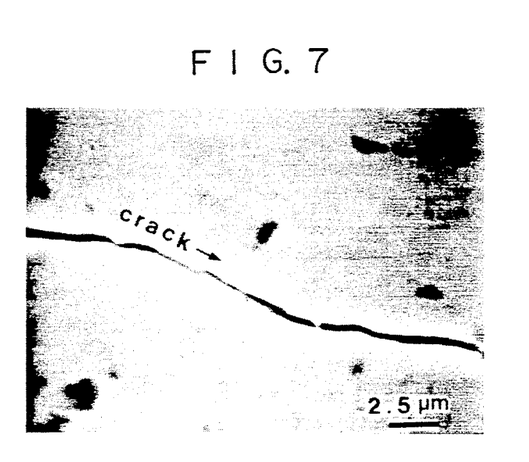
FIG. 7 is an electron micrograph showing propagation of cracks starting from Vickers indentation on the surface of a sintered body consisting of a titanium carbide single phase (magnification: ×4,000).

FIG. 6 is an optical micrograph which shows the microstructure of the resulting sintered body. The state of cracks propagated from Vickers indentation is shown in FIG. 7. The measurements of the relative density, mechanical properties and resistivity made in the same manner as in Example 1 are shown in Table 1. The sliding characteristics measured in the same manner as in Example 2 and changes in friction coefficient during sliding test are shown in Table 2 and FIG. 3, respectively.

As shown in FIG. 6, when graphite was not contained, growth of the particles was conspicuous, and the average grain size reached about 30 μm. Furthermore, as shown in FIG. 7, the cracks generated at the Vickers indentation propagated in nearly a straight line. This result greatly differs from the complicated deflection in propagation of cracks which occurred when graphite was added.

It is considered that these microstructural features affected various mechanical properties and the sintered body had a lower three-point bending strength and fracture toughness than those of the composite materials, as shown in Table 1.

As shown in Table 2, a friction coefficient against copper of the sintered body in dry air was the highest and much adhesion of copper to a titanium carbide disc was recognized by microscopic observation of sliding tracks.

COMPARATIVE EXAMPLE 2

To titanium carbide powders (average particle size: 2 μm; purity: 99% or higher) were added 5% by weight, 7% by weight, 10% by weight and 15% by weight of carbon black powders (density: 1.83 g/cc; average particle size: 0.3 μm; purity: 99.9% or higher), respectively. Each of the mixtures was milled in acetone as a solvent by a planetary ball mill for 17 hours. The milled product was subjected to natural drying for 24 hours and ground. Then, the mixed powders were recovered.

The resulting mixed powders were hot pressed at 2,000° C. for 2 hours at a pressure of 40 MPa in an argon atmosphere to obtain a sintered body.

Figure 8:
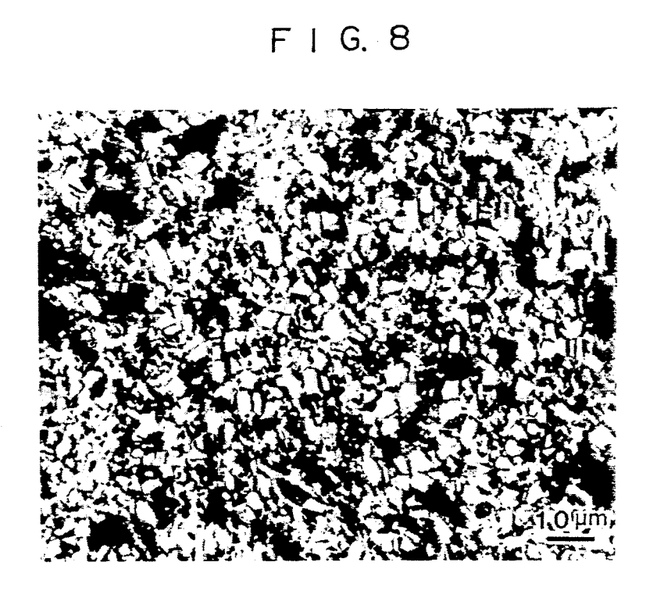
FIG. 8 is an optical micrograph showing the microstructure of a sintered body which contains 15% by weight of carbon black as a carbon source (magnification: ×1,000).

The characteristics of the resulting sintered bodies are shown in Table 1. An optical micrograph of the microstructure of the sintered body containing 15% by weight of carbon black as a carbon source is shown in FIG. 8. The sliding characteristics of the sintered bodies measured in the same manner as in Example 2. The results of the same sliding tests as in Example 2 are shown in Table 2 and FIG. 3, respectively.

These sintered bodies were inferior to those containing the same amount of graphite in mechanical properties and sliding characteristics. This inferiority is more conspicuously enhanced with increase of the carbon content.

The specific wear rate of the fired bodies of the Examples was calculated from the results of Table 2 by the following formula:

$$\text{Specific wear rate } [mm^2/N] = \frac{\text{Cu wear (mg)/Density of Cu } (8.96 \text{ mg/mm}^3)}{\text{Test length (mm)} \times \text{Load (N)}}$$

Figure 9:
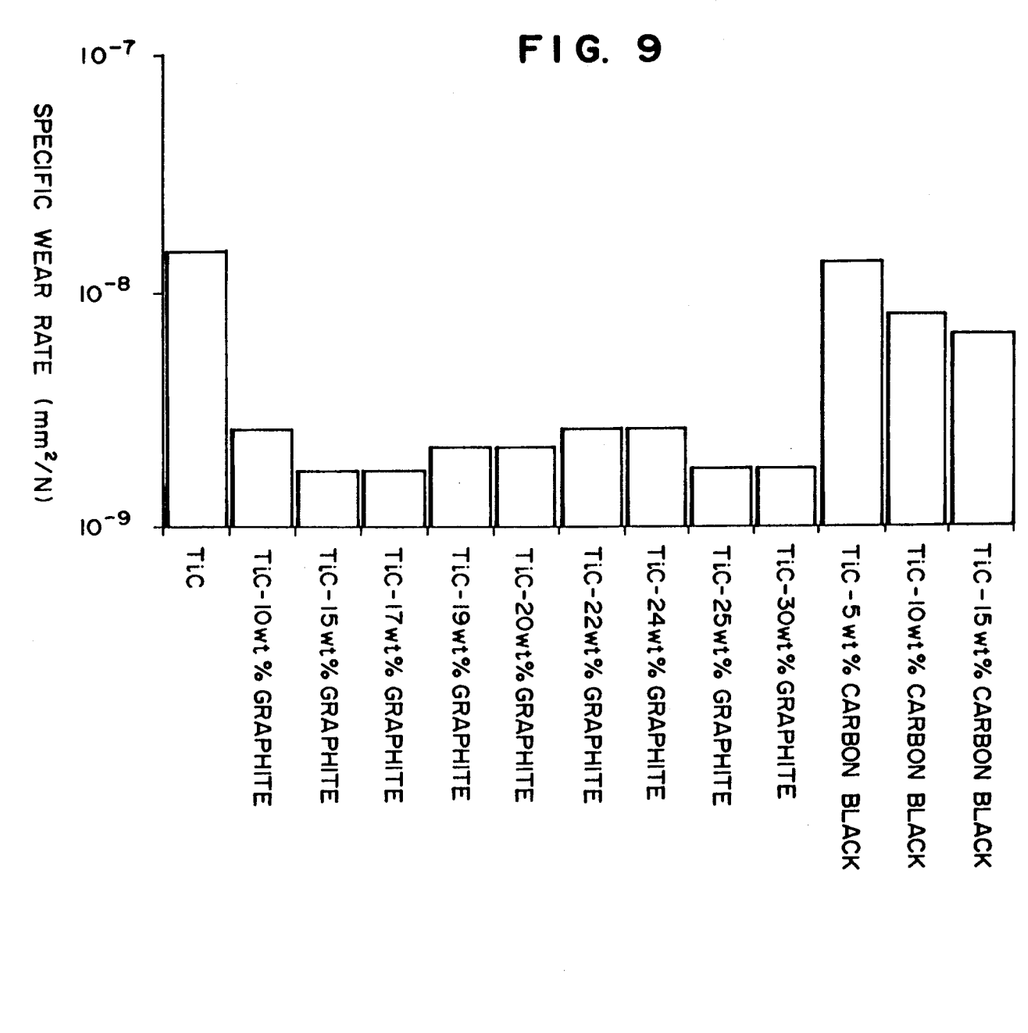
FIG. 9 is a graph showing the specific wear rates enumerated in Table 3.

The results are shown in Table 3. Furthermore, the results are graphically shown in FIG. 9.

As can be seen from Table 3, the specific wear rate of the sintered bodies of the present invention was $3 \times 10^{-9}$ mm$^2$/N or less.

TABLE 1

| | Samples | Relative density % TD | Mechanical properties | | | Resistivity | |
|---|---|---|---|---|---|---|---|
| | | | Room Temp. strength MPa | Fracture toughness MPam$^{\frac{1}{2}}$ | Hardness Hv | Parallel to HP axis μΩcm | Normal to HP axis μΩcm |
| Example 1 | 5% graphite added | 98.7 | 650 | 4.1 | 1540 | 61 | 65 |
| Example 2 | 10% graphite added | 98.3 | 520 | 4.1 | 1100 | 70 | 84 |
| Example 3 | 15% graphite added | 97.7 | 410 | 4.3 | 890 | 86 | 107 |
| Example 4 | 17% graphite added | 96.9 | 350 | 4.2 | 720 | 94 | 120 |
| Example 5 | 19% graphite added | 96.2 | 300 | 3.9 | 610 | 103 | 136 |
| Example 6 | 20% graphite added | 95.9 | 270 | 3.6 | 530 | 110 | 140 |
| Example 7 | 22% graphite added | 95.3 | 240 | | | 118 | 164 |
| Example 8 | 24% graphite added | 94.8 | 200 | | | 129 | 185 |
| Example 9 | 25% graphite added | 94.5 | 190 | | | 133 | 200 |
| Example 10 | 27% graphite added | 94.3 | 160 | | | 148 | 221 |
| Example 11 | 29% graphite added | 94.1 | 150 | | | 162 | 247 |
| Example 12 | 30% graphite added | 94.1 | 140 | | | 170 | 260 |
| Comp. Ex. 1 | Tic single phase | 98.2 | 380 | 3.4 | 2310 | 59 | 59 |
| | 5% carbon black added | 98.3 | 480 | 3.8 | 1530 | 67 | 72 |
| Comp. Ex. 2 | 10% carbon black added | 96.5 | 330 | 3.1 | 980 | 74 | 88 |
| | 15% carbon black added | 91.6 | 170 | 2.2 | 380 | 120 | 155 |

TABLE 2

| | Samples | Friction coefficient | | Wear rate (mg) | |
|---|---|---|---|---|---|
| | | Average | Deviation | Disc | Pin |
| Example 2 | 10% graphite added | 0.48 | 0.05 | 0.18 | 0.06 |
| Example 3 | 15% graphite added | 0.42 | 0.11 | 0.10 | 0.04 |
| Example 4 | 17% graphite added | 0.40 | 0.06 | 0.15 | 0.04 |
| Example 5 | 19% graphite added | 0.38 | 0.06 | 0.24 | 0.05 |
| Example 6 | 20% graphite added | 0.37 | 0.04 | 0.31 | 0.05 |
| Example 7 | 22% graphite added | 0.35 | 0.06 | 0.48 | 0.06 |
| Example 8 | 24% graphite added | 0.34 | 0.06 | 0.69 | 0.06 |
| Example 9 | 25% graphite added | 0.33 | 0.06 | 0.81 | 0.04 |
| Example 12 | 30% graphite added | 0.30 | 0.05 | 1.60 | 0.04 |
| Comp. Ex. 1 | Tic single phase | 0.60 | 0.21 | 0.02 | 0.35 |
| | 5% carbon black added | 0.62 | 0.19 | 0.70 | 0.30 |
| Comp. Ex. 2 | 10% carbon black added | 0.61 | 0.12 | 0.15 | 0.18 |
| | 15% carbon black added | 0.52 | 0.10 | 0.18 | 0.15 |

TABLE 3

| | Graphite/carbon black/Tic (wt %) | Cu wear (mg) | Test length (mg) | Load (mm) | Specific wear rate (N) |
|---|---|---|---|---|---|
| Example 4 | Graphite 10 (CG10) | 0.06 | 314000 | 8.3 | $2.5694 \times 10^{-9}$ |
| Example 5 | Graphite 15 (CG15) | 0.04 | 314000 | 8.3 | $1.7129 \times 10^{-9}$ |
| Example 6 | Graphite 17 (CG17) | 0.04 | 314000 | 8.3 | $1.7129 \times 10^{-9}$ |
| Example 7 | Graphite 19 (CG19) | 0.05 | 314000 | 8.3 | $2.1412 \times 10^{-9}$ |
| Example 8 | Graphite 20 (CG20) | 0.05 | 314000 | 8.3 | $2.1412 \times 10^{-9}$ |
| Example 9 | Graphite 22 (CG22) | 0.06 | 314000 | 8.3 | $2.5694 \times 10^{-9}$ |
| Example 10 | Graphite 24 (CG24) | 0.06 | 314000 | 8.3 | $2.5694 \times 10^{-9}$ |
| Example 11 | Graphite 25 (CG25) | 0.04 | 314000 | 8.3 | $1.7129 \times 10^{-9}$ |
| Example 12 | Graphite 30 (CG30) | 0.04 | 314000 | 8.3 | $1.7129 \times 10^{-9}$ |
| Comp. Ex. 1 | Tic | 0.25 | 314000 | 8.3 | $1.4988 \times 10^{-8}$ |
| Comp. Ex. 2 | Carbon black 5 | 0.30 | 314000 | 8.3 | $1.2847 \times 10^{-8}$ |
| | Carbon black 10 | 0.18 | 314000 | 8.3 | $7.7083 \times 10^{-9}$ |
| | Carbon black 15 | 0.15 | 314000 | 8.3 | $6.4236 \times 10^{-9}$ |

What is claimed is:

1. A self-lubricating and wear resistant composite material for sliding members which, comprises a titanium carbide matrix having 3-30% by weight graphite particles excellent in crystallinity which are uniformly dispersed in said titanium carbide matrix.

2. A self-lubricating and wear resistant composite material for sliding members according to claim 1 which has a dry friction coefficient against copper of 0.5 or less.

3. A self-lubricating and wear resistant composite material for sliding members according to claim 1 which has a specific wear rate of copper of $3 \times 10^{-9}$ mm$^2$/N or less in a dry sliding test with copper.

4. A self-lubricating and wear resistant composite material for sliding members according to claim 1 which contains the graphite particles in an amount of 10-30% by weight.

5. A self-lubricating and wear resistant composite material for sliding members according to claim 1 which contains the graphite particles in an amount of 3-15% by weight.

6. A self-lubricating and wear resistant composite material for sliding members according to claim 1 which contains the graphite particles in an amount of 15-30% by weight.

7. A self-lubricating and wear resistant composite material for sliding members according to claim 1 which contains the graphite particles in an amount of 17-25% by weight.

8. A self-lubricating and wear resistant composite material for sliding members according to claim 1 wherein the titanium carbide has an average particles size of 1-10 μm.

9. A self-lubricating and wear resistant composite material for sliding members according to claim 1 wherein the titanium carbide has an average particle size of 2-5 μm.

10. A self-lubricating and wear resistant composite material for sliding members according to claim 1 wherein the graphite particles have an average particle size of 3-6 μm.

11. A self-lubricating and wear resistant composite material for sliding members according to claim 1 wherein the graphite particles have a density of 2.22 g/cc or higher.

* * * * *